UNITED STATES PATENT OFFICE.

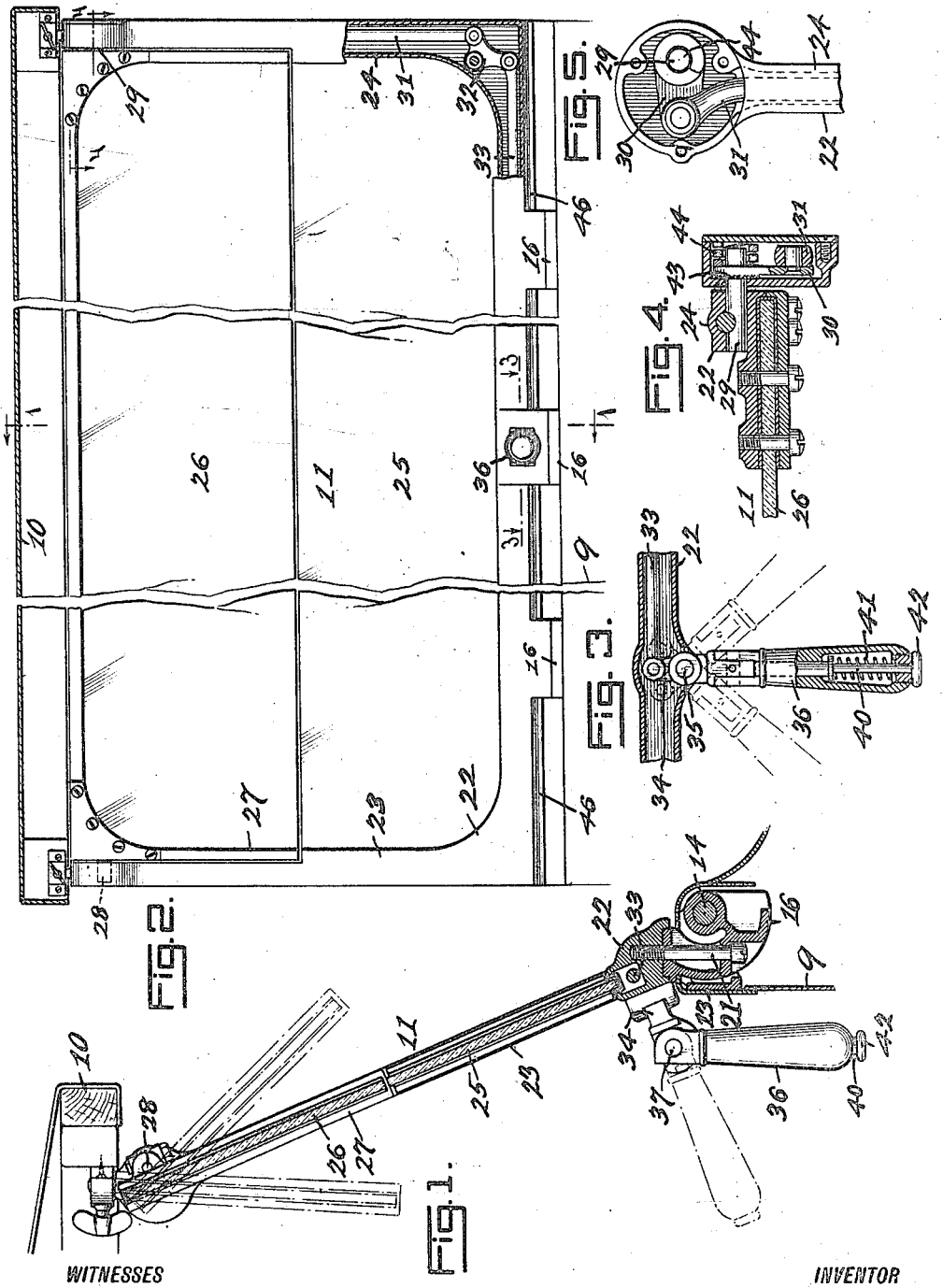

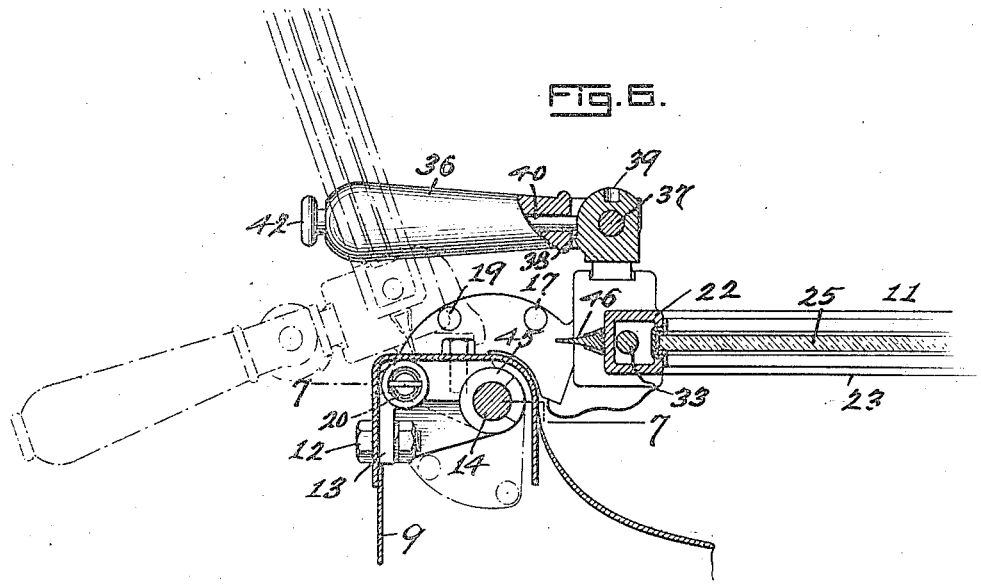
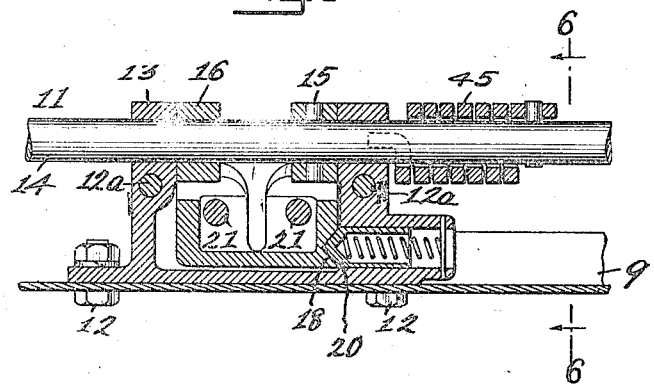
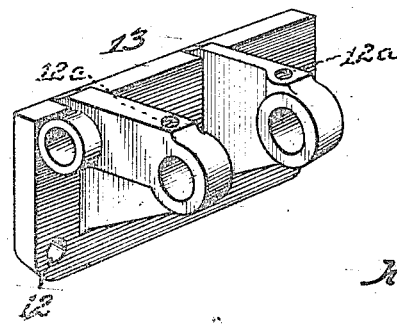

KARL FEILCKE, OF INDIANAPOLIS, INDIANA.

WIND-SHIELD.

1,215,133.

Specification of Letters Patent.

Patented Feb. 6, 1917.

Application filed April 15, 1916. Serial No. 91,327.

*To all whom it may concern:*

Be it known that I, KARL FEILCKE, a subject of the Emperor of Germany, and a resident of Indianapolis, in the county of Marion and State of Indiana, have invented certain new and useful Improvements in Wind-Shields, of which the following is a specification.

My invention relates to wind shields for automobiles, and the object thereof is to provide such a device so constructed that for all possible conditions, weather and road, the greatest possible comfort will result to the occupants of the automobile.

A further object is to provide means convenient to the driver whereby he may adjust the wind shield into any desired position with one hand.

A further object is to so construct the wind shield as to secure, in some of these positions, an efficient anchorage for the front end of the summer top, and make a good, tight, connection with the side curtains or a demountable body.

A further object is to provide such a structure which overcomes the present necessity for alighting from the auto to adjust the wind shield as an entirety, which provides a positively one-man operation, which overcomes the present independent side arm movement with its consequent twisting of the shield, which provides smooth exterior surfaces on the side arms instead of the wing-nuts, bosses, etc., which prevents a good snug fit with the side curtains or the demountable body, which provides concealed hinges allowing the shield to swing forward into horizontal position and backward into any desired upright position, which prevents the sagging of the upper glass when the shield is in forward horizontal position, which is balanced in any of its positions, which is locked in desired positions, which is adapted to be installed upon any dash, and which is entirely under the control of one manipulative element.

My invention is fully described in the following specification, of which the accompanying drawings form a part, in which like characters refer to like parts in each of the views, and in which:—

Figure 1 is a section taken through a wind shield constructed in accordance with my present invention, as on the line 1—1 of Fig. 2;

Fig. 2 is a view thereof from the driver's seat, partly broken away to show a detail;

Fig. 3 is an enlarged section taken on the line 3—3 of Fig. 2;

Fig. 4 is an enlarged section taken on the line 4—4 of Fig. 2;

Fig. 5 is a view of Fig. 4 from the right hand side, with a cover plate removed to show details;

Fig. 6 is a section taken on the line 6—6 of Fig. 7, with the wind shield in forward horizontal position;

Fig. 7 is a section taken on the line 7—7 of Fig. 6; and Fig. 8 is a detached view of a hinge which I employ.

In the drawings I have shown the dash 9 and the forward edge of the summer top or demountable body 10 of an automobile, my shield 11 being pivotally supported on the former and is adapted to closely engage the latter to insure a weather proof joint therebetween, and, as will be seen from Fig. 2, the outer surfaces of the shield 11 are smooth, thereby insuring a smooth fit thereof with the side curtains of a summer top or with a demountable body.

Bolted at 12 to the dash 9 is a hinge bracket 13 which carries a transverse rod 14 in a rotatable manner and to which rod is secured, at 15, a hinge block 16 the rearward side of which is of segmental formation in the form illustrated, as shown in Fig. 1, to permit swinging movement of the block 16 with respect to the dash while still maintaining a close fit therewith.

The block 16 is provided with a plurality of conical depressions in one side thereof, 17 and 19 being shown in Fig. 6 and 18 in Fig. 7, and into any one of which a spring actuated conical nosed plunger 20 is yieldingly held, whereby the said block and connected shield may be locked in any one of three positions, although the number thereof is arbitrary, said plunger being carried in the hinge bracket 13.

When the dash 9 is provided in the form of a casing, as is usual at present, I may also provide bolts 12ª to assist in firmly holding said hinge bracket 13 in place, it being imperative that this bracket be rigid as it supports the entire weight of the wind shield.

Secured to the hinge block 16, as by bolts 21, Fig. 1, is a U-shaped frame 22 extending the width of the dash 9 and the side arms 23 and 24 of which carry the lower glass 25 and the upper glass 26, the latter being held within a swinging frame 27 having end journals 28 and 29, Fig. 2, bearing in the upper ends of the side arms 23 and 24. The upper glass frame or sash 27 does not itself engage the inner surfaces of the side arms, whereby no binding therebetween can result, as through rust, dirt, etc., and I may, as shown in Fig. 2, recess the inner sides of the side arms 23 and 24 to receive the frame 27 in such manner as to aline the vertical ends of both glasses 25 and 26.

As shown in Figs. 4 and 5, the journal 29 carries an arm 30 the outer end of which is in pivotal connection with a vertical rod 31 arranged within the side arm 24 and the lower end of which rod is pivoted to one end of a bell-crank 32, the other end of said bell-crank being in pivotal connection with a horizontal rod 33 arranged within the lower member of the U-shaped frame 22 and extending normally to the middle thereof.

At its inner end the rod 33 is pivoted to a lever 34 pivotally supported at 35 within the said frame 22 in such manner as to permit swinging movement laterally, and the outer end of this lever 34 is provided with a handle 36 pivoted by a horizontally arranged pin 37 to said outer end whereby the handle is adapted to be swung in a vertical plane, the outer end of the lever 34 being made concentric with the axis of the pin 37 and provided with a stop 38 and with a recess 39 on the axis of the lever itself. The handle 36 is provided with a longitudinally arranged plunger 40 normally maintained toward the handle pivot 37 by means of a spring 41, to ride over the concentric surface of the lever 34, to be limited in movement by the stop 38, and to be forced into the recess 39 when the handle is raised to permit such entry and, when this has occurred, the handle and lever constitute a unit, but which may be split into two independently movable elements by withdrawing the plunger 40 from the recess 39 by means of a button head 42.

The operation is very simple:— Assuming the handle 36 to be in the position shown in Fig. 1, and it is desired to swing the upper glass into either of the two positions indicated by dotted lines, all that is necessary is to raise the handle into the position indicated by dotted lines and swing the same laterally upon its pivot 35, it now being a component part of the lever 34, and the horizontal rod 33 is moved transversely of the automobile in a reverse direction to that of the handle 36, thereby correspondingly rocking the bell-crank 32 and rotating the journal 29 accordingly, thereby swinging the upper glass correspondingly about a horizontal axis.

The upper glass is held in any position into which it had been moved because of the friction between the parts hereinbefore described, and because of the toothed, corrugated, or serrated, surfaces between the journal arm 30 and the interior surface of the side arm 24, and a spring, as shown at 43 and 44, respectively, Fig. 4.

When it is desired to swing the shield as an entirety the handle is raised to engage the lever 34 as already described, and the U-shaped frame 22 is then swung upon the axis of the hinge rod 14 into the desired position, the plunger 20 yielding to permit such movement and again engaging the frame through the medium of one of the recesses 17, 18, or 19, in the block 16 and any number of which, as already stated, may be provided. If the shield is engaged with the summer top or demountable body previous to such shield movement it is disconnected therefrom as will be understood, said top or body being slightly raised to permit the passage of the shield if said shield occupies the relationship shown in Fig. 1, but this relationship is arbitrary as will be obvious.

In order to balance the shield 11 I provide a strong-coil spring 45, Figs. 6 and 7, secured at one end to the rod 14 and at its other end to the hinge bracket 13, thereby rendering the movement of the shield in an easy manner, and I may, if desired, employ a flexible strip 46 beneath the U-shaped frame 22 to close the gap between the latter and the top of the dash 9.

My wind shield is very simple in construction and in installation, and is entirely operable by the one hand of a driver not otherwise engaged, as on the steering-wheel, and I reserve the right to make such changes over the form shown as properly come within the scope of the appended claims.

The operating handle, when not being used, may be moved into the inoperative position shown in Fig. 1 by merely retracting the plunger therein, and it will be noted that the pivot or hinge for the shield as a whole is entirely concealed, this being a highly important feature of my invention, as no water can reach the same to cause rust, nor can dirt or dust enter thereto to cause trouble.

Having fully described my invention, what I claim as new, and desire to secure by Letters Patent, is:—

1. A wind shield, comprising a support, a frame pivoted thereto, a lower glass carried by said frame, an upper glass in pivotal connection with said frame, a handle for swinging said frame on its pivot, and means connected with said handle for swinging said upper glass on its pivot.

2. A wind shield, comprising a support, a frame pivoted thereto, a lower glass carried by said frame, an upper glass in pivotal connection with said frame, a handle movable in a vertical plane to swing said frame on its pivot and means connected with said handle for swinging said upper glass on its pivot in the movement of said handle in a horizontal plane.

3. A wind shield, comprising a support, a frame pivoted thereto, a lower glass, an upper glass in pivotal connection with said frame, a handle for swinging said frame on its pivot, means for yieldingly locking said frame in desired positions, and means connected with said handle for swinging said upper glass on its pivot.

4. A wind shield, comprising a support, a frame pivoted thereto, a lower glass, an upper glass in pivotal connection with said frame, a handle for swinging said frame on its pivot, a balance spring for counterbalancing the weight of said frame, and means connected with said handle for swinging said upper glass on its pivot.

5. A wind shield, comprising a support, a frame pivoted thereto, a lower glass, an upper glass in pivotal connection with said frame, a pivotally mounted handle for swinging said frame on its pivot, means including a lever connected with said handle for swinging said upper glass on its pivot, and means for holding said handle in operative and in inoperative positions with respect to said lever.

6. A wind shield, comprising a support, adapted for attachment to the dash of an automobile, a transverse horizontal rod carried thereby, a hinge block carried by said rod, a U-shaped frame carried by said hinge block, a lower glass in said frame, an upper glass in pivotal connection with said frame, a handle for swinging said frame on its pivot, and means operable by said handle for swinging said upper glass on its pivot.

KARL FEILCKE.

Witnesses:
M. B. RICE,
EDW. O. STARK.